United States Patent [19]
Yamaguchi et al.

[11] Patent Number: 6,139,988
[45] Date of Patent: Oct. 31, 2000

[54] HYDROGEN ABSORBING ALLOY ELECTRODE AND METHOD OF PRODUCING THE SAME

[75] Inventors: Kouichi Yamaguchi; Masatoshi Arai, both of Gunma-ken; Hiroto Sugahara, Fukui-ken, all of Japan

[73] Assignee: Shin-Etsu Chemical Co., Ltd., Tokyo, Japan

[21] Appl. No.: 09/156,877

[22] Filed: Sep. 18, 1998

[30] Foreign Application Priority Data

Sep. 19, 1997 [JP] Japan ................................. 9-273588

[51] Int. Cl.$^7$ ........................................................ H02M 4/40
[52] U.S. Cl. ............................................. 429/218.2; 420/900
[58] Field of Search ........................ 420/900; 429/218.2

[56] References Cited

U.S. PATENT DOCUMENTS 5,965,294  10/1999  Hamada et al. ...................... 429/218.2

*Primary Examiner*—Maria Nuzzolillo
*Assistant Examiner*—Monique Wills
*Attorney, Agent, or Firm*—Millen, White, Zelano & Branigan, P.C.

[57] ABSTRACT

A hydrogen absorbing alloy electrode having on a conductive support a layer which contains as a main component a hydrogen absorbing alloy powder capable of absorbing and releasing hydrogen electrochemically and is covered with a fluorine-containing water repellent layer on the surface side; with the fluorine-containing water repellent layer being a layer formed by coating and curing a water repellent agent comprising (A) a straight-chain perfluorinated compound having at least two secondary amino groups per molecule and a divalent perfluoroalkylene or perfluoropolyether structure in the main chain and (B) a fluorine-containing epoxy compound having at least three epoxy groups per molecule.

26 Claims, No Drawings

HYDROGEN ABSORBING ALLOY ELECTRODE AND METHOD OF PRODUCING THE SAME

FIELD OF THE INVENTION

The present invention relates to an electrode utilizing a hydrogen absorbing alloy, more particularly to a hydrogen absorbing alloy electrode used as a negative electrode in an alkali storage battery having high capacity and enabling high-speed charging, and a method of producing such a hydrogen absorbing alloy electrode.

BACKGROUND OF THE INVENTION

Storage batteries which have so far been in much demand are a nickel-cadmium storage battery and a lead storage battery. However, as the use range of storage batteries have been increasing in recent years, there has been a growing request for the development of storage batteries having lighter weight, higher capacity and higher energy density. In such circumstances, intense interest has been shown towards nickel-hydrogen alkali storage batteries wherein the electrode utilizing a hydrogen absorbing alloy capable of absorbing and releasing hydrogen electrochemically is used as a negative electrode and nickel hydride is used as a positive electrode.

In such nickel-hydrogen alkali storage batteries, the hydrogen absorbing alloy electrode electrolyzes the water in an alkali electrolytic solution and absorbs the hydrogen gas produced by the electrolysis while it is being charged with electricity. During the discharge, on the other hand, the hydrogen absorbing alloy electrode releases the hydrogen gas and, at the same time, oxidizes the hydrogen gas to return it to the state of water.

When the storage battery is overcharged for the purpose of rapid charging, however, not only oxygen gas is generated from the positive electrode but also hydrogen gas is generated from the negative electrode, and thereby the internal pressure of the storage battery is increased.

This is being the case, it has been proposed to design the negative electrode so as to have a greater chargeable capacity than the positive electrode, thereby preferentially generating oxygen gas upon charging. Therein, the oxygen gas generated is made to react with the hydrogen gas produced on the negative electrode to be converted into water; as a result, a rise in the internal pressure of the storage battery can be controlled.

An increase in the chargeable capacity of the negative electrode, although it can inhibit the increase in an internal pressure of the battery upon overcharging, has a defect that it requires a correlative decrease in the volume occupied by the positive electrode in the storage battery to result in the lowering of the battery capacity (per volume capacity).

By our intensive studies with the intention of obviating such a defect, it has already been found and disclosed in Japanese Tokkai Hei 9-97605 (wherein the term "Tokkai" as used herein means an "unexamined published patent application") that, when the surface of a hydrogen absorbing alloy electrode is coated with a fluorine-containing water repellent agent, no surface of the electrode is wetted with an electrolytic solution and a three-phase interface of gas, liquid and solid is formed thereon, and thereby not only the hydrogen gas absorbing properties of the electrode can be improved but also no increase of internal pressure is caused in the storage battery even when the storage battery undergoes rapid charging to result in extension of charge-discharge cycle life, and further an increase in chargeable capacity of the negative electrode can be reduced to the minimum to result in prevention of drop in battery capacity.

SUMMARY OF THE INVENTION

As a result of our further examination on the water repellent agent as mentioned above, we have found a more effective repellent, thereby achieving the present invention.

Therefore, an object of the present invention is to provide a hydrogen absorbing alloy electrode which can ensure high capacity and high-speed charging in an alkali storage battery.

Another object of the present invention is to provide a method of producing a hydrogen absorbing alloy electrode which can ensure high capacity and high-speed charging in an alkali storage battery.

The above-described objects of the present invention are attained with a hydrogen absorbing alloy electrode having on a conductive support a layer which contains as a main component a hydrogen absorbing alloy powder capable of absorbing and releasing hydrogen electrochemically and is covered with a fluorine-containing water repellent layer on the surface side; with the fluorine-containing water repellent layer being a layer formed by coating and curing a water repellent agent comprising (A) a straight-chain perfluorinated compound having at least two secondary amino groups per molecule and a divalent perfluoroalkylene or perfluoropolyether structure in the main chain and (B) a fluorine-containing epoxy compound having at least three epoxy groups per molecule.

When the hydrogen absorbing alloy electrode according to the present invention is used as negative electrode in the production of a closed-type nickel-hydrogen alkali storage battery, the storage battery produced can have a substantial reduction in the increase of internal pressure due to generation of hydrogen gas upon charging and discharging, so it has a long service life. Even in the case of rapid charging, the storage battery using the present electrode can have a reduced rise of internal pressure and retain consistent gas absorption characteristics for a long time. Thus, the present electrode enables the storage battery to have a high capacity and rapid charging suitability.

DETAILED DESCRIPTION OF THE INVENTION

The hydrogen absorbing alloy used in the present invention does not have any particular restriction, but can be appropriately selected from known hydrogen absorbing alloys which have so far been used for hydrogen absorbing alloy electrodes. In view of cheapness and suitability for mass production, it is desirable to use a hydrogen absorbing alloy produced using a "Mish metal" (hereinafter referred to as "Mm") as a main raw material, such as a $MmNi_5$ alloy.

More specifically, the MmNi5 alloy is a $LaNi_5$ alloy having a $CaCu_5$-type crystal structure wherein the La element is partially replaced by Ce, Pr, Nd and other rare earth elements.

For instance, Mm is constituted of 45 weight % of Ce, 30 weight % of La, 5 weight % of Nd and the residual % of other rare earth elements.

In the present invention, the water repellent layer forming a three-phase interface of gas, liquid and solid inhibits the electrode surface from being wetted with an electrolytic solution. In order to provide such a water repellent layer on the hydrogen absorbing alloy layer, the fluorine-containing water repellent agent comprising the aforementioned Compounds (A) and (B) is employed in the present invention.

With respect to Compound (A), or a straight-chain perfluorinated compound having at least two secondary amino groups per molecule and a divalent perfluoroalkylene or perfluoropolyether structure in the main chain, the compounds represented by the following formula (I) are used to advantage:

(I)

In the above formula (I), Rf is a divalent perfluoroalkylene or perfluoropolyether group.

Suitable examples of such a divalent perfluoroalkylene group include the groups of formula, —$C_nF_{2n}$— (wherein n is an integer of 1 to 10, preferably 2 to 6).

Suitable examples of such a divalent perfluoropolyether group include the groups of formula (1),

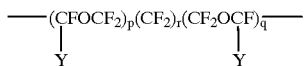
(1)

(wherein Y is F or $CF_3$, p and q are each a number of no smaller than 1, provided that $2 \leq p+q \leq 200$, preferably $2 \leq p+q \leq 100$, and r is an integer of 0 to 6); the group of formula (2),

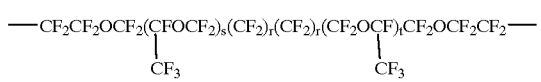
(2)

(wherein $0 \leq r \leq 6$, and $s \geq 0$, $t \geq 0$, $0 \leq s+t \leq 200$, preferably the sum total of s and t is an integer of 2 to 100); the groups of formula (3),

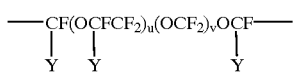
(3)

(wherein Y is F or $CF_3$, u is an integer of 1 to 100, and v is an integer of 1 to 100); and the groups of formula (4),

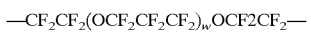
(4)

(wherein w is an integer of 1 to 100).

Examples of Rf are illustrated below:

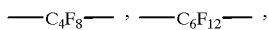

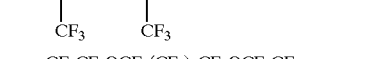

-continued

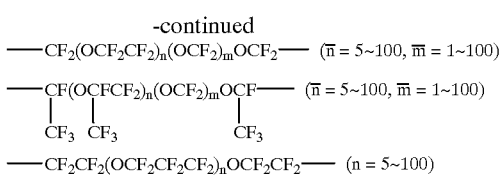

$$—CF_2CF_2(OCF_2CF_2CF_2)_nOCF_2CF_2—  \quad (n = 5\sim100)$$

In the foregoing formula (I), X is a secondary amino group represented by the following formula (5), (6) or (7):

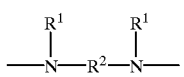
(5)

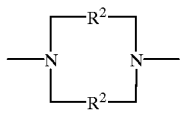
(6)

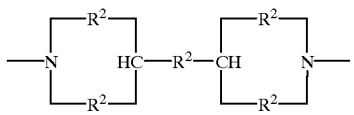
(7)

(wherein $R^1$ is a substituted or unsubstituted monovalent hydrocarbon group, preferably having 1 to 12 carbon atoms, particularly preferably 1 to 8 carbon atoms; with examples including alkyl groups such as methyl, ethyl, propyl, isopropyl, butyl, isobutyl, tert-butyl, pentyl, neopentyl, hexyl, heptyl, octyl, nonyl and decyl groups, cycloalkyl groups such as cyclopentyl, cyclohexyl and cycloheptyl groups, aryl groups such as phenyl, tolyl, xylyl and naphthyl groups, aralkyl groups such as benzyl, phenylethyl and phenylpropyl groups, and groups formed by substituting halogen atoms (e.g., fluorine, chlorine, bromine) for part or all of hydrogen atoms of the above-recited groups each, such as chloromethyl, bromoethyl, chloropropyl, trifluoropropyl and 3,3,4,4,5,5,6,6,6-nonafluorohexyl groups: and R2 is a substituted or unsubstituted divalent hydrocarbon group, preferably having 1 to 10 carbon atoms, particularly preferably 2 to 6 carbon atoms; with examples including alkylene groups such as methylene, ethylene, propylene, methylethylene, butylene and hexamethylene groups, cycloalkylene groups such as a cyclohexylene group, arylene groups such as phenylene, tolylene, xylylene, naphthylene and biphenylene groups, and groups formed by substituting halogen atom(s) for part or all of hydrogen atoms of the above-recited groups each).

Additionally, two $R^2$ groups in formula (6) and five $R^2$ groups in formula (7) may be the same or different.

Examples of X in the foregoing formula (I) are illustrated below, wherein Me stands for a methyl group and Ph stands for a phenyl group:

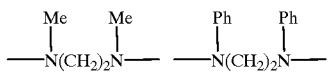

-continued

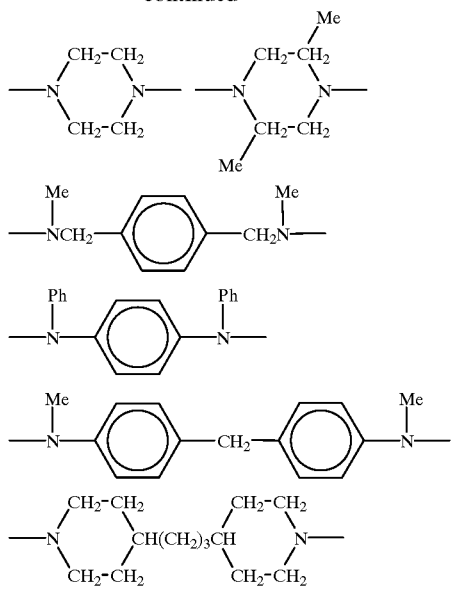

In the foregoing formula (I), a is an integer including 0, preferably an integer of from 0 to 10, and particularly preferably an integer of from 0 to 6.

The fluorine-containing epoxy compound as Compound (B) according to the present invention functions as a cross-linking agent for the aforementioned Compound (A). The present Compound (B) has, per molecule, at least 3 epoxy groups and at least one fluorine-containing group, preferably selected from monovalent perfluoroalkyl groups, monovalent perfluoropolyether groups, divalent perfluoroalkylene groups or divalent perfluoropolyether groups.

Suitable examples of such a fluorine-containing group include monovalent perfluoroalkyl groups of formula, $C_mF_{2m+1}—$ (wherein m is an integer of from 1 to 20, preferably from 2 to 10), divalent perfluoroalkylene groups of formula, $—C_mF_{2m}—$ (wherein m is an integer of from 1 to 20, preferably from 2 to 10), monovalent perfluoropolyether groups of formula,

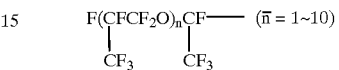

(wherein n is an integer of from 1 to 10), and divalent perfluoropolyether groups of formula,

(wherein the average value of m+n is from 2 to 100).

Examples of a fluorine-containing epoxy compound as Compound (B) are illustrated below, wherein Me stands for a methyl group and Ph stands for a phenyl group:

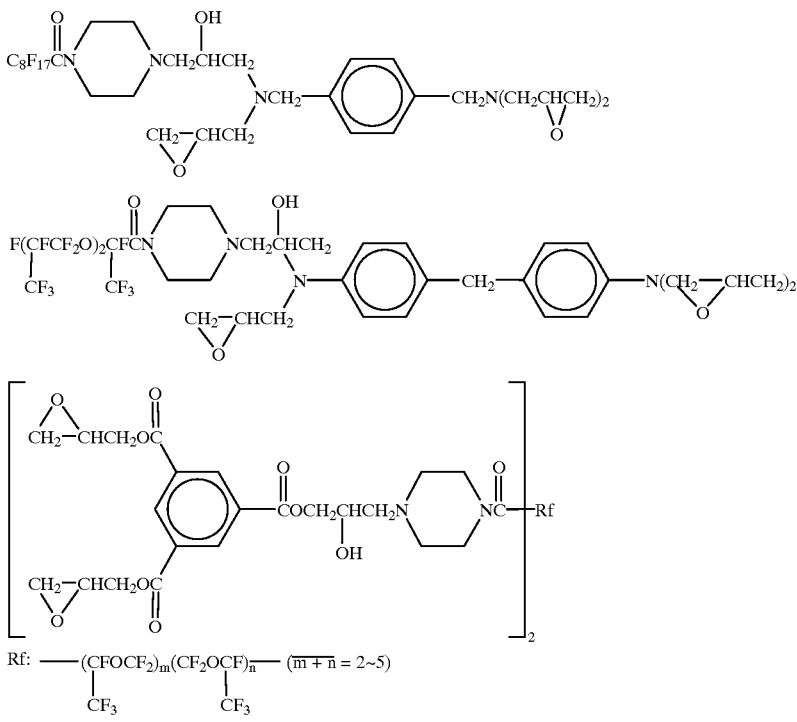

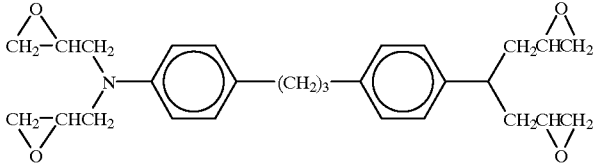

-continued

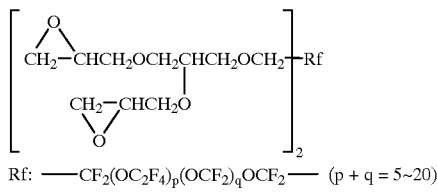

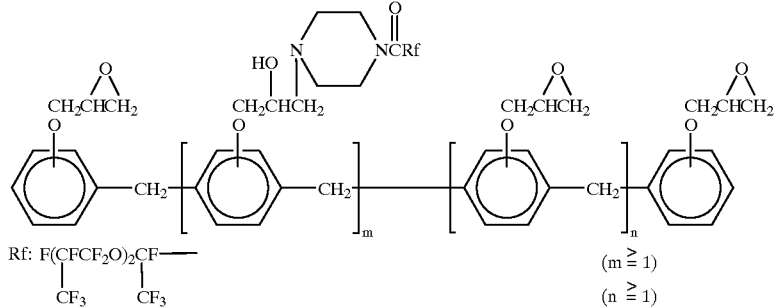

$(m \geq 1)$
$(n \geq 1)$

The compounds as illustrated above may be used alone or as a mixture of two or more thereof.

In preparing the present water repellent agent, Compound (B) is mixed with Compound (A) in such a proportion that the epoxy groups from Compound (B) are present in a quantity of 0.5 to 5 moles, preferably 1 to 2 moles, per mole of secondary amino groups from Compound (A). When the quantity of epoxy groups is less than 0.5 mole per mole of secondary amino groups, the resulting mixture is deficient in cross-linking density; while, when it is more than 5 moles per mole of secondary amino groups, the resulting mixture has too high cross-linking density and the cured matter thereof suffers deterioration in physical properties.

To the present fluorine-containing water repellent agent, various additives can be added for the purpose of increasing the practical utility, if desired. Examples of such additives include curing accelerators, such as imidazoles and Lewis acids, and adhesiveness improvers, such as β-(3,4-epoxycyclohexyl)ethyltrimethoxysilane, γ-glycidoxypropyltri- ethoxysilane and γ-aminopropyltriethoxysilane.

The present fluorine-containing water repellent agent can be cured by kneading the aforementioned Compounds (A) and (B) together. In a case of preparing the present water repellent agent as a two-part agent, a solution of Compound (A) and a solution of Compound (B) are packed up separately, and these two solutions are mixed at the time of use. Therein, it is also possible to adjust the concentration of each solution to a desired value by adding a fluorine-containing solvent, such as 1,3-bis(trifluoromethyl)benzene or perfluorooctane, at the time of use or storage.

The present fluorine-containing water repellent agent can be cured at room temperature, but it is generally desirable that the curing thereof be carried out by several-hour standing at 50–100° C.

The conductive support used in the present invention has no particular restriction, and so it can be selected properly from conventional materials used for the negative electrode of an alkali storage battery. Examples of a conductive support usable herein include three-dimensional conductive supports such as fiber nickel and foam nickel, and two-dimensional conductive supports such as punched metal, expanded metal and metallic net.

It is desirable that the present fluorine-containing water repellent agent be present on the whole surface of the electrode at a coverage of 0.1 to 5.0 mg/cm$^2$, preferably 0.5 to 2.5 mg/cm$^2$. When the coverage is less than 0.1 mg/cm$^2$, the effect of the water repellent agent is insufficient; while, when it is more than 5.0 mg/cm$^2$, the dispersion of hydrogen gas into the electrode is suppressed.

Further, it is desirable for the present hydrogen absorbing alloy electrode to be produced by applying a paste containing a binder besides the hydrogen absorbing alloy powder as mentioned above to a conductive support, drying the paste, molding the paste-coated support into a desired shape by pressure, coating the thus molded matter with the present fluorine-containing water repellent agent and then drying it, thereby forming a layer of cured fluorine-containing water repellent resin.

Also, the present electrode can be produced by forming the foregoing paste into a sheet, bonding the sheet onto a conductive support using pressure, and thereon coating and drying the present water repellent agent.

The binder used in a small amount for binding a hydrogen absorbing alloy powder has no particular restriction, and so it can be selected properly from conventional binders used for hydrogen absorbing alloy electrodes. Examples of a binder usable herein include cellulose derivatives, such as methyl cellulose and carboxymethyl cellulose, polyvinyl alcohol, polyethylene oxide, polytetrafluoroethylene and polymer latexes. These binders may be used alone or as a mixture of two or more thereof.

The proportion of a binder used is generally from 0.1 to 6 weight % to the hydrogen absorbing alloy powder.

In accordance with the present invention, the electrode surface is covered with a fluorine-containing water repellent layer, so that the three-phase interface of gas, liquid and solid is formed when the present electrode is used as the negative electrode of a battery. In addition, the fluorine-containing water repellent used can be prepared as a solution and diluted with certain solvents, so that it requires no surfactant. Thus, the present electrode undergoes no bad influence of surfactant, including a water repellency drop attributable to surfactant, and can absorb hydrogen gas efficiently.

The present invention will now be illustrated in greater detail by reference to the following examples. However, the invention should not be construed as being limited to these examples.

EXAMPLES 1–4

Mish metal (Mm), Ni, Co, Mn and Al were weighed out in their respective amounts such that the atomic ratio of those metals was 1.0:3.75:0.75:0.20:0.30, and molten with an arc furnace to produce an alloy. After the alloy was subjected to heat treatment in a vacuum, it was cooled in a vacuum, and then ground mechanically to prepare a hydrogen absorbing alloy powder.

The alloy powder obtained was formed into a paste by being kneaded with a 3 weight % water solution of polyvinyl alcohol. The paste was filled homogeneously into a porous medium made of a foam nickel having a voids content of 94-96 %, and then dried. The resulting material was subjected to a pressure forming process, thereby making a negative plate.

On this negative plate, a water repellent solution was sprayed with a spray gun at a coverage rate as set forth in Table 1 and dried for 30 minutes in a 70° C. drying oven to prepare a hydrogen absorbing alloy electrode.

The water repellent solution used herein was prepared by diluting 1.0 parts by weight of a water repellent agent as set forth in Table 1 with a mixture of 49.5 parts by weight of perfluorooctance with 49.5 parts by weight of 1,3-bis (trifluoromethyl)benzene

TABLE 1

| | Water Repellent Agent | |
|---|---|---|
| Example | (A)/(B) = (g/g) | Coverage Rate (mg/cm$^2$) |
| 1 | (i)/(ii) (100/5.7) | 0.26 |
| 2 | (i)/(ii) (100/5.7) | 1.52 |
| 3 | (iii)/(iv) (100/2.0) | 2.20 |
| 4 | (iii)/(iv) (100/2.0) | 4.81 |

The marks (i), (ii), (iii) and (iv) in Table 1 stand for the compounds represented by the following formulae (i), (ii), (iii) and (iv) respectively:

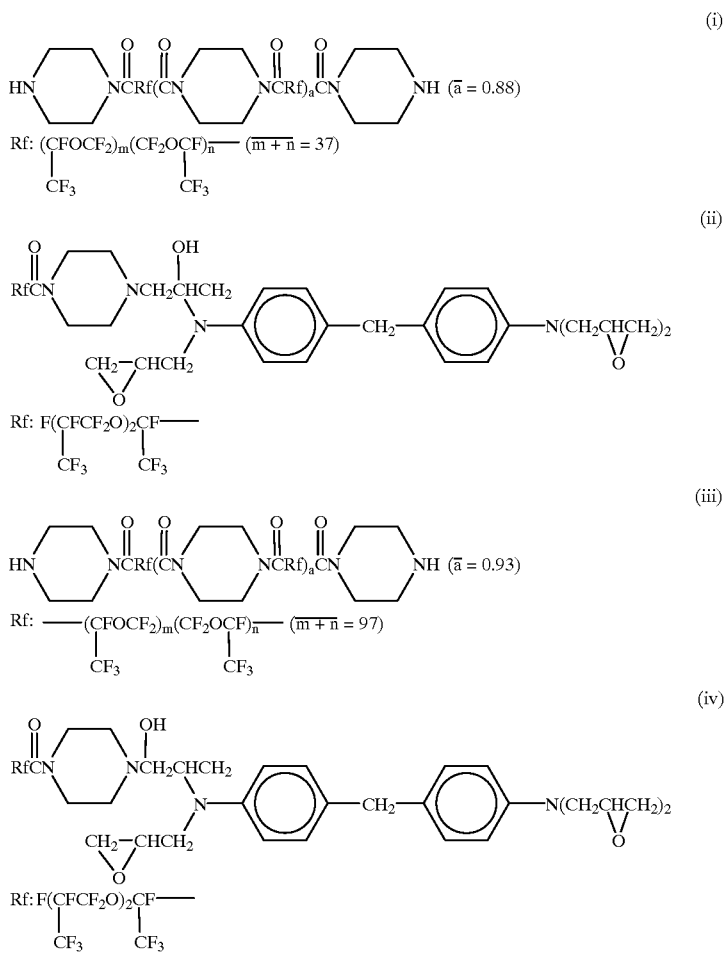

Then, a spiral wound electrode was made by employing each of the electrodes prepared above as a negative electrode and a sintered Ni electrode prepared in a conventional manner as a positive electrode, sandwiching a separator made of nonwoven fabric between these electrodes put one on top the other, and then winding them into a spiral. The thus made spiral wound electrode was placed in a battery can. And the can was filled with a 6N water solution of potassium hydroxide as an electrolytic solution, and then sealed. Thus, four kinds of closed-type nickel-hydrogen alkali storage batteries having a nominal capacity of 1,200 mAh were produced.

These four kinds of storage batteries were each charged under the condition described below as the temperature was kept at 20° C.: The charging current from the first cycle to the third cycle was increased so as to be 0.1 C, 0.2 C and 0.5 C respectively, and the charging current after the fourth cycle was fixed at 1 C. Additionally, the charging of each storage battery was continued until the charged capacity reached 200% of the nominal capacity. On the other hand, the discharge in every cycle was carried out at 0.2 C until the battery voltage was decreased to 0.8 V.

In the course of charge-discharge cycles mentioned above, the internal pressures of each storage battery in the 5th, 10th, 20th and 50th cycles were measured. The data on 5 the highest internal pressures in those cycles are set forth in Table 2.

COMPARATIVE EXAMPLE 1

An electrode and a closed-type nickel-hydrogen storage battery were produced in the same manners as in Example 1, except that the negative electrode plate was not coated with any water repellent resin layer, and the highest internal pressures of the thus produced battery on the foregoing cycles were measured by the same procedure as in Example 1. The results obtained are also shown in Table 2.

TABLE 2

| | Internal Pressure of storage Battery (kg/cm$^2$) | | | |
|---|---|---|---|---|
| | 5th-cycle | 10th-cycle | 20th-cycle | 50th-cycle |
| Example 1 | 3.2 | 3.9 | 5.2 | 11.9 |
| Example 2 | 2.2 | 2.4 | 3.6 | 5.2 |
| Example 3 | 1.9 | 2.1 | 3.1 | 4.9 |
| Example 4 | 2.8 | 3.6 | 4.9 | 7.8 |
| Comparative Example 1 | 13.9 | 18.8 | 23.1 | 28.9 |

As can be seen from Table 2, the increase in internal pressure on charge-discharge cycles was materially reduced in every case of using the hydrogen absorbing alloy electrode according to the present invention. In particular, it was estimated from less increments of internal pressure in Examples 2 and 3 each that the optimum coverage rate of the fluorine-containing water repellent agent was from 0.5 to 2 mg/cm$^2$.

What is claimed is:

1. A hydrogen absorbing alloy electrode having on a conductive support a layer which contains as a main component a hydrogen absorbing alloy powder capable of absorbing and releasing hydrogen electrochemically and is covered with a fluorine-containing water repellent layer on the surface side; said fluorine-containing water repellent layer being a layer formed by coating and curing a water repellent agent comprising (A) a compound formula (I):

(I)

wherein Rf is a divalent perfluoroalkylene or perfluoropolyether group, X is a secondary amino group and a is a number 0 to 10, and (B) a fluorine-containing epoxy compound having at least three epoxy groups per molecule.

2. A hydrogen absorbing alloy electrode according to claim 1, wherein the divalent perfluoroalkylene group is a group of formula —C$_n$F$_{2n}$—, wherein n is an integer of 1 to 10, and the divalent perfluoropolyether group is a group of formula (1), (2), (3) or (4);

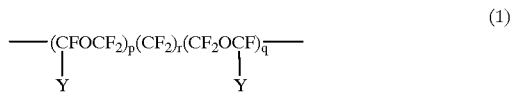
(1)

wherein Y is F or CF$_3$, p and q are each a number of no smaller than 1, provided that 2≦p+q≦200, and r is an integer of 0 to 6,

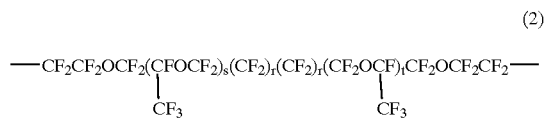
(2)

wherein 0≦r≦6, and s≧0, t≧0, 0≦s+t≦200,

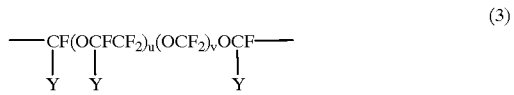
(3)

wherein Y is F or CF$_3$, u is an integer of 1 to 100, and v is an integer of 1 to 100,

(4)

wherein w is an integer of 1 to 100.

3. A hydrogen absorbing alloy electrode according to claim 1, wherein the secondary amino group is a group of formula (5), (6) or (7),

(5)

(6)

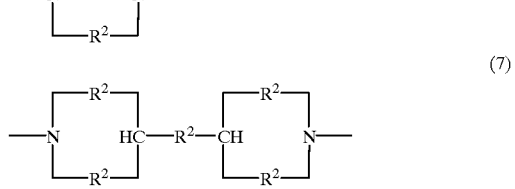
(7)

wherein R$^1$ groups are the same or different monovalent substituted or unsubstituted hydrocarbon groups and R$^2$ groups are the same or different divalent substituted or unsubstituted hydrocarbon groups.

4. A hydrogen absorbing alloy electrode having on a conductive support a layer which contains as a main component a hydrogen absorbing alloy powder capable of absorbing and releasing hydrogen electrochemically and is covered with a fluorine-containing water repellent layer on the surface side; said fluorine-containing water repellent layer being a layer formed by coating and curing a water repellent agent comprising (A) a straight-chain perfluorinated compound having at least two secondary amino groups per molecule and a divalent perfluoroalkylene or perfluoropolyether structure in the main chain and (B) an epoxy compound containing at least one group selected from monovalent perfluoroalkyl groups, monovalent perfluoropolyether groups, divalent perfluroalkylene groups and divalent perfluoropolyether groups.

5. A method of producing a hydrogen absorbing alloy electrode of claim 1 comprising preparing a molded matter by applying a paste containing a hydrogen absorbing alloy powder and a binder to a conductive support, drying the paste and molding the paste-coated support into a desired shape by pressure; covering said molded matter with a water repellent resin layer formed by coating thereon a water repellent agent comprising (A) and (B) and curing the coated agent by drying.

6. The hydrogen absorbing alloy electrode of claim 1, wherein the fluorine-containing water repellent layer is present on the whole surface of the electrode at a coverage of 0.1 to 5.0 mg/cm$^2$.

7. The hydrogen absorbing alloy electrode of claim 1, wherein the water repellent agent comprises the Compound (B) in a proportion that the epoxy groups from the Compound (B) are present in a quantity of 0.5 to 5 moles per mole of secondary amino groups from the Compound (A).

8. The hydrogen absorbing alloy electrode of claim 2, wherein in formula (1), $2 \leq p+q \leq 100$ and in formula (2), the sum total of s and t is an integer of 2 to 100.

9. The hydrogen absorbing alloy electrode of claim 3, wherein part or all of the hydrogens of the $R^1$ groups and $R^2$ groups are independently substituted with halogen atom(s).

10. The hydrogen absorbing alloy electrode of claim 4, wherein the fluorine-containing water repellent layer is present on the whole surface of the electrode at a coverage of 0.1 to 5.0 mg/cm$^2$.

11. The hydrogen absorbing alloy electrode of claim 4, wherein the water repellent agent comprises the Compound (B) in a proportion that the epoxy groups from the Compound (B) are present in a quantity of 0.5 to 5 moles per mole of secondary amino groups from the Compound (A).

12. A hydrogen absorbing alloy electrode according to claim 4, wherein the divalent perfluoroalkylene group is a group of formula —C$_n$—F$_{2n}$—, wherein n is an integer of 1 to 10, and the divalent perfluoropolyether group is a group of formula (1), (2), (3) or (4);

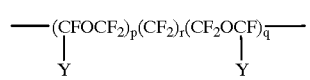

(1)

wherein Y is F or CF$_3$, p and q are each a number of no smaller than 1, provided that $2 \leq p+q \leq 200$, and r is an integer of 0 to 6,

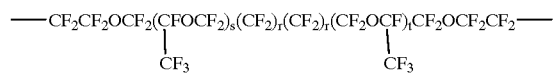

(2)

wherin $0 \leq r \leq 6$, and $s \geq 0, t \geq 0, 0 \leq s + t \leq 200$,

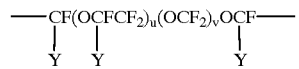

(3)

wherein Y is F or CF$_3$, u is an integer of 1 to 100, and v is an integer of 1 to 100, —CF$_2$CF$_2$ (OCF$_2$CF$_2$CF$_2$ )$_w$OCF$_2$CF$_2$— (4)

wherein w is an integer of 1 to 100.

13. The hydrogen absorbing alloy electrode of claim 12, wherein in formula (1), $2 \leq p+q \leq 100$ and in formula (2), the sum total of s and t is an integer of 2 to 100.

14. A hydrogen absorbing alloy electrode according to claim 4, wherein the secondary amino group is a group of formula (5), (6) or (7),

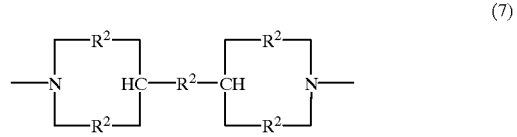

wherein $R^1$ groups are the same or different monovalent substituted or unsubstituted hydrocarbon groups and $R^2$ groups are the same or different divalent substituted or unsubstituted hydrocarbon groups.

15. The hydrogen absorbing alloy electrode of claim 14, wherein part or all of the hydrogens of the $R^1$ groups and $R^2$ groups are independently substituted with halogen atom(s).

16. A storage battery comprising, as a negative electrode, a hydrogen absorbing alloy electrode of claim 1.

17. A storage battery comprising, as a negative electrode, a hydrogen absorbing alloy electrode of claim 4.

18. The hydrogen absorbing alloy electrode of claim 1, wherein said hydrogen absorbing alloy is an MmNi$_5$ alloy.

19. The hydrogen absorbing alloy electrode of claim 18, wherein said MmNi$_5$ alloy is a LaNi$_5$ alloy having a CaCu$_5$-type crystal structure wherein the La element is partially replaced by Ce, Pr, Nd or another rare earth element.

20. The hydrogen absorbing alloy electrode of claim 3, wherein $R^1$ is an alkyl, cycloalkyl, aryl or aralkyl group having 1 to 12 carbon atoms; and/or $R^2$ is an alkylene, cycloalkylene or arylene group having 1 to 10 carbon atoms.

21. The hydrogen absorbing alloy electrode of claim 20, wherein $R^1$ has 1 to 8 carbon atoms, and/or $R^2$ has 2 to 6 carbon atoms.

22. The hydrogen absorbing alloy electrode of claim 4, wherein said hydrogen absorbing alloy is an MmNi$_5$ alloy.

23. The hydrogen absorbing alloy electrode of claim 22, wherein said MmNi$_5$ alloy is a LaNi$_5$ alloy having a CaCu$_5$-type crystal structure wherein the La element is partially replaced by Ce, Pr, Nd or another rare earth element.

24. The hydrogen absorbing alloy electrode of claim 14, wherein $R^1$ is an alkyl, cycloalkyl, aryl or aralkyl group having 1 to 12 carbon atoms; and/or $R^2$ is an alkylene, cycloalkylene or arylene group having 1 to 10 carbon atoms.

25. The hydrogen absorbing alloy electrode of claim 24, wherein $R^1$ has 1 to 8 carbon atoms, and/or $R^2$ has 2 to 6 carbon atoms.

26. A method of producing a hydrogen absorbing alloy electrode of claim 4, comprising preparing a molded matter by applying a paste containing a hydrogen absorbing alloy powder and a binder to a conductive support, drying the paste and molding the paste-coated support into a desired shape by pressure; covering said molded matter with a water repellent resin layer formed by coating thereon a water repellent agent comprising (A) and curing the coated agent by drying.

\* \* \* \* \*